US012032311B2

(12) United States Patent
Takada

(10) Patent No.: US 12,032,311 B2
(45) Date of Patent: Jul. 9, 2024

(54) IMAGE FORMATION APPARATUS AND IMAGE FORMATION METHOD

(71) Applicant: Konica Minolta, Inc., Tokyo (JP)

(72) Inventor: Mikihiko Takada, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/942,753

(22) Filed: Sep. 12, 2022

(65) Prior Publication Data

US 2023/0095629 A1 Mar. 30, 2023

(30) Foreign Application Priority Data

Sep. 24, 2021 (JP) ................................ 2021-155460

(51) Int. Cl.
*G03G 15/20* (2006.01)

(52) U.S. Cl.
CPC ................................ *G03G 15/2014* (2013.01)

(58) Field of Classification Search
CPC ... G03G 2215/1666; G03G 2215/1671; G03G 15/2014
See application file for complete search history.

(56) References Cited

U.S. PATENT DOCUMENTS

| | | | | |
|---|---|---|---|---|
| 2010/0008683 A1* | 1/2010 | Yoshikawa | ........ | G03G 15/2039 399/45 |
| 2014/0029996 A1 | 1/2014 | Nozawa | | |
| 2019/0018352 A1 | 1/2019 | Shiokawa et al. | | |

FOREIGN PATENT DOCUMENTS

| | | |
|---|---|---|
| EP | 866385 | 9/1998 |
| EP | 3125048 | 2/2017 |
| JP | 2001042665 | 2/2001 |
| JP | 2017-156516 A | 9/2017 |

OTHER PUBLICATIONS

Machine translation of JP2001042665 (Year: 1999).*
Extended European Search Report (EESR) dated Feb. 3, 2023 issued in European patent application No. 22195214.6.

* cited by examiner

*Primary Examiner* — Walter L Lindsay, Jr.
*Assistant Examiner* — Andrew V Do
(74) *Attorney, Agent, or Firm* — RANKIN, HILL & CLARK LLP

(57) ABSTRACT

An image formation apparatus includes: a transferrer that forms a toner image on an image formation surface of paper; a fixer that fixes the toner image on the paper; a paper conveyor that conveys the paper between an upstream side of the transferrer and a downstream side of the fixer in a paper conveyance direction; and a paper pre-heater that heats, on the upstream side of the transferrer in the paper conveyance direction, the image formation surface of the paper.

16 Claims, 11 Drawing Sheets

IMAGE FORMATION APPARATUS AND IMAGE FORMATION METHOD

The entire disclosure of Japanese patent Application No. 2021-155460, filed on Sep. 24, 2021, is incorporated herein by reference in its entirety.

BACKGROUND

Technological Field

The present invention relates to an image formation apparatus and an image formation method.

Description of the Related Art

When paper is cooled in a low temperature environment, toner is difficult to fuse onto the paper, and temperature of a fixing member falls. Therefore, fixing under offset (low-temperature fixing) occurs. To deal with this problem, the paper is heated before the toner is fixed to raise temperature of the paper.

For example, JP 2017-156516 A describes an image formation apparatus including a paper feeder that feeds continuous paper, a paper ejector that winds the fed continuous paper, a transferrer that is disposed between the paper feeder and the paper ejector in a paper conveyance direction and forms a toner image on paper, a fixer that is disposed on a downstream side of the transferrer and an upstream side of the paper ejector and fixes the toner image on the paper, and a paper pre-heating member that is disposed between the transferrer and the fixer in the paper conveyance direction and heats the paper.

In JP 2017-156516 A, the paper pre-heating member is disposed between the transferrer and the fixer. Therefore, the paper pre-heating member is brought into contact with a back surface of the paper. Even if only the back surface of the paper is heated, temperature of a front surface of the paper such as thick paper or tack paper does not sufficiently rise, resulting in fixing under offset. Tack paper used for label paper is formed of a base material, adhesive, and release paper in that order from a front-surface side, and thus is thick. Therefore, even if the tack paper is heated from a release paper side on the back surface, the heat is difficult to be transmitted to a base material side. If an amount of heating from a back-surface side of the paper is increased to such an extent that fixing under offset does not occur, moisture contained in the paper is vaporized, and an air bubble is generated in a toner layer at a time of fixing, resulting in image unevenness (toner blister). In addition, in a case of coated paper, the paper may be swollen due to separation of surface coating and a paper base material. In a case of tack paper, the paper may be swollen due to separation of a base material and release paper (paper blister).

If, between the transferrer and the fixer, the paper pre-heating member is brought into contact with the paper, disturbance of an unfixed toner image occurs. In particular, if the paper pre-heating member that slides on paper is used, toner is more easily scattered. Therefore, there has been a problem that disturbance of an unfixed toner image may occur.

SUMMARY

An object of the present invention is to provide an image formation apparatus and image formation method capable of reducing occurrence of image formation failure.

To achieve the abovementioned object, according to an aspect of the present invention, an image formation apparatus reflecting one aspect of the present invention comprises

- a transferrer that forms a toner image on an image formation surface of paper;
- a fixer that fixes the toner image on the paper;
- a paper conveyor that conveys the paper between an upstream side of the transferrer and a downstream side of the fixer in a paper conveyance direction; and
- a paper pre-heater that heats, on the upstream side of the transferrer in the paper conveyance direction, the image formation surface of the paper.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
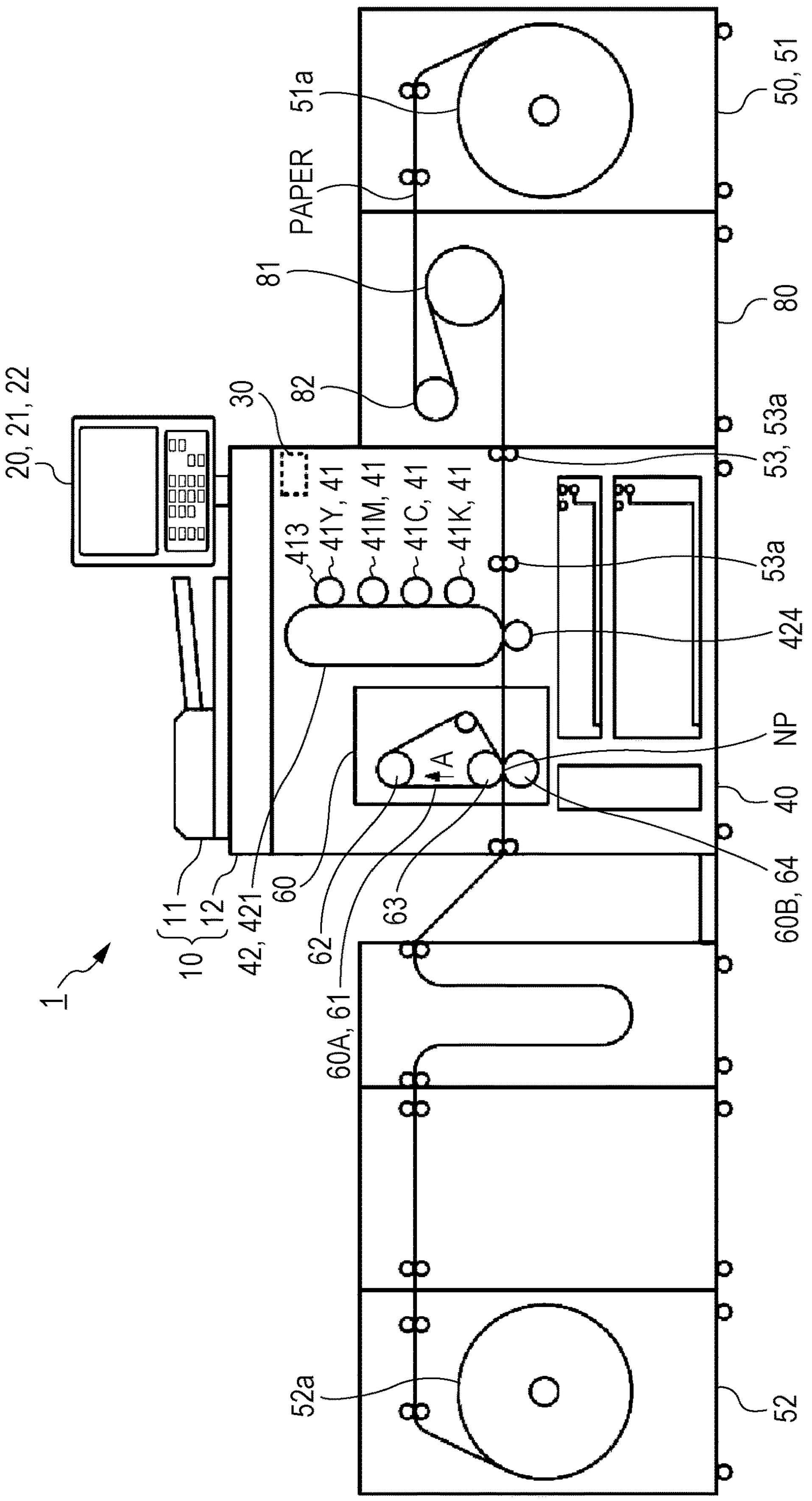
FIG. 1 is a diagram schematically showing an overall configuration of an image formation apparatus according to an embodiment of the present invention.
Figure 2:
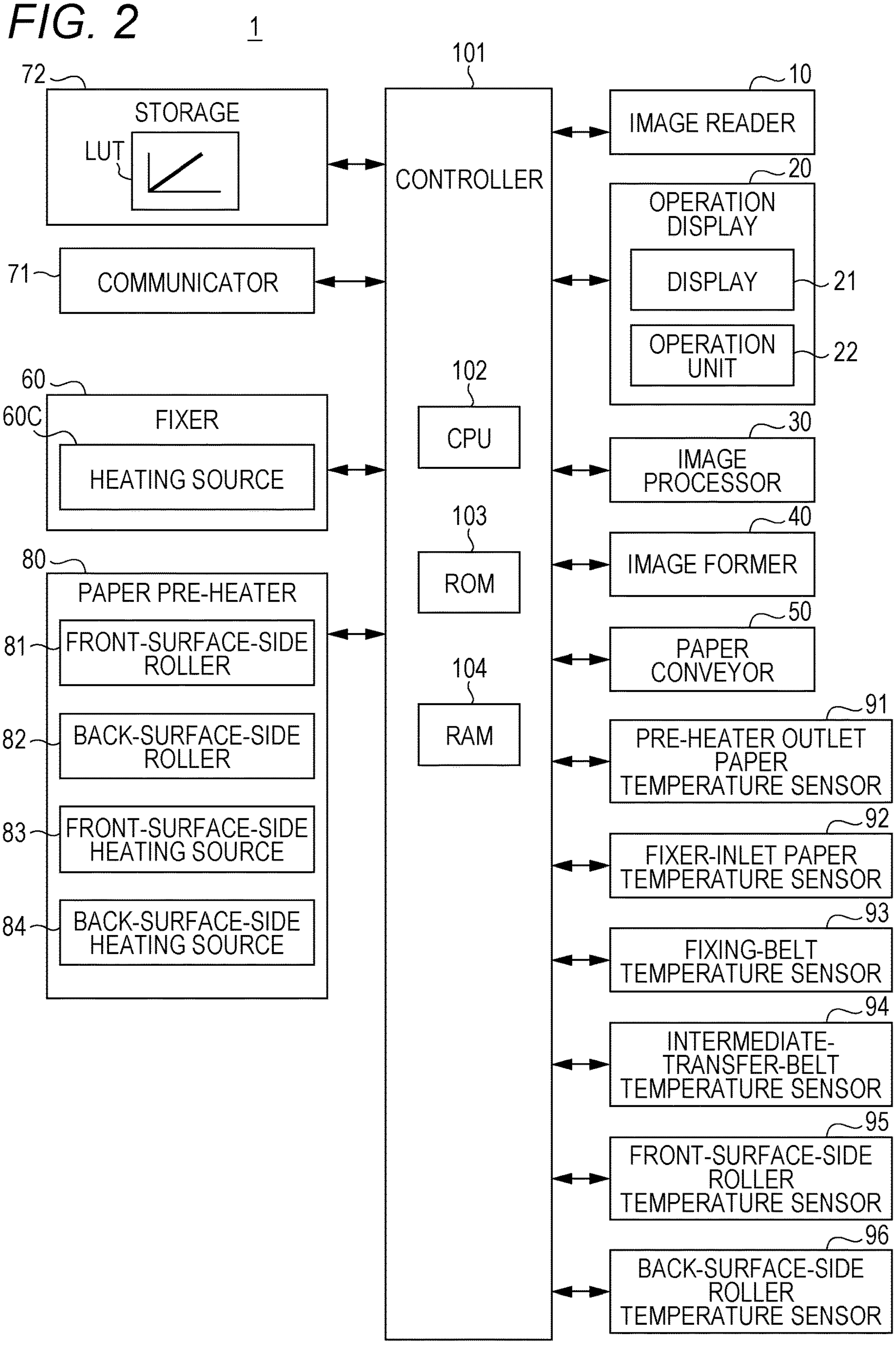
FIG. 2 is a diagram showing main units of a control system of the image formation apparatus according to the present embodiment.

Hereinafter, one or more embodiments of the present invention will be described with reference to the drawings. However, the scope of the invention is not limited to the disclosed embodiments. FIG. 1 is a diagram schematically showing an overall configuration of an image formation apparatus 1 according to an embodiment of the present invention. FIG. 2 is a diagram showing main units of a control system of the image formation apparatus 1 according to the present embodiment. The image formation apparatus 1 is an intermediate transfer type color image formation apparatus utilizing electrophotographic process technology. That is, the image formation apparatus 1 primarily transfers toner images of colors of yellow (Y), magenta (M), cyan (C), and black (K), which are formed on respective photoreceptor drums 413, onto an intermediate transfer belt 421, superimposes the toner images of the four colors on the intermediate transfer belt 421, and then secondarily transfers the superimposed toner images onto paper, thereby forming a toner image.

In addition, the image formation apparatus 1 adopts a tandem system in which the photoreceptor drums 413 corresponding to the four colors of YMCK are arranged in series in a running direction of the intermediate transfer belt 421, and the toner images of the respective colors are sequentially transferred onto the intermediate transfer belt 421 with one procedure.

As shown in FIG. 2, the image formation apparatus 1 includes an image reader 10, an operation display 20, an image processor 30, an image former 40, a paper conveyor 50, a fixer 60, a paper pre-heater 80, a controller 101, and the like.

The controller 101 includes a central processing unit (CPU) 102, a read only memory (ROM) 103, a random access memory (RAM) 104, and the like. The CPU 102 reads, from the ROM 103, a program corresponding to processing content, loads the program into the RAM 104, and centrally controls operation of each block of the image formation apparatus 1 in cooperation with the loaded program. At this time, various data stored in a storage 72 are referred to. The storage 72 includes, for example, a non-volatile semiconductor memory (so-called flash memory) or a hard disk drive.

Via a communicator 71, the controller 101 transmits and receives various data to and from an external apparatus (for example, a personal computer) connected to a communication network such as a local area network (LAN) or a wide area network (WAN). For example, the controller 101 receives image data transmitted from the external apparatus, and forms a toner image on the paper on the basis of the image data (input image data). The communicator 71 includes, for example, a communication control card such as a LAN card.

The image reader 10 includes an automatic document feeder 11, which is referred to as an auto document feeder (ADF), a document image scanner (scanner) 12, and the like.

With a conveyance mechanism, the automatic document feeder 11 conveys a document placed on a document tray, and sends the document to the document image scanner 12. The automatic document feeder 11 can continuously read images (including both sides) of a large number of documents placed on the document tray at once.

The document image scanner 12 optically scans a document conveyed onto a contact glass from the automatic document feeder 11, or a document placed on the contact glass, forms, on a light receiving surface of a charge coupled device (CCD) sensor (not shown), an image of light reflected from the document, and reads a document image. The image reader 10 generates input image data on the basis of a result of reading by the document image scanner 12. The input image data is subjected to predetermined image processing in the image processor 30.

The operation display 20 includes, for example, a liquid crystal display (LCD) with a touch panel, and functions as a display 21 and an operation unit 22. The display 21 displays various operation screens, an image state, an operation status of each function, and the like according to a display control signal input from the controller 101. The operation unit 22 includes various operation keys such as a numeric keypad and a start key, receives various input operations by a user, and outputs an operation signal to the controller 101. The input operations includes operation of selecting any one of a normal mode, a low-gloss mode in which a gloss level is lower than a predetermined value (value of the normal mode), and a high-gloss mode in which the gloss level is higher than the predetermined value.

The image processor 30 includes a circuit or the like that performs digital image processing on the input image data according to an initial setting or user setting. For example, the image processor 30 performs gradation correction on the basis of gradation correction data (gradation correction table) under control of the controller 101. In addition to the gradation correction, on the input image data, the image processor 30 performs various kinds of correction processing such as color correction and shading correction, compression processing, and the like. The image former 40 is controlled on the basis of the image data subjected to these processings.

The image former 40 includes image formation units 41Y, 41M, 41C, and 41K, an intermediate transfer unit 42, and the like. The image formation units 41Y, 41M, 41C, and 41K are for forming, on the basis of the input image data, images with colored toners of a Y component, an M component, a C component, and a K component, respectively.

The image formation units 41Y, 41M, 41C, and 41K for the Y component, M component, C component, and K component, respectively, have a similar configuration. For convenience of illustration and description, common constituents are denoted by the same reference signs, and Y, M, C, or K is added to a reference sign when distinguishing each component. In FIG. 1, only a constituent of the image formation unit 41Y for the Y component is denoted by a reference sign, and reference signs for constituents of the other image formation units 41M, 41C, and 41K are omitted.

An image formation unit 41 includes an exposurer (not shown), a developer (not shown), a photoreceptor drum 413, an electric charger (not shown), a drum cleaner (not shown), and the like.

The photoreceptor drum 413 is, for example, a negatively charged organic photo-conductor (OPC) in which an under coat layer (UCL), a charge generation layer (CGL), and a charge transport layer (CTL) are sequentially laminated on a peripheral surface of an aluminum conductive cylindrical body (aluminum tube). The charge generation layer includes an organic semiconductor obtained by dispersing a charge generation material (polycarbonate, for example) in a resin binder (for example, polycarbonate), and generates a pair of positive charge and negative charge with exposure by the exposurer. The charge transport layer is formed by a resin binder (polycarbonate resin, for example) in which a hole-transport material (electron-donating nitrogen-containing compound) is dispersed, and transports a positive charge generated in the charge generation layer to a surface of the charge transport layer.

The controller 101 rotates the photoreceptor drums 413 at a constant peripheral speed by controlling drive current supplied to a drive motor (not shown) that rotates the photoreceptor drums 413.

The electric charger uniformly charges a surface of the photoreceptor drum 413 having photoconductivity to negative polarity. The exposurer includes, for example, a semiconductor laser, and irradiates the photoreceptor drum 413 with laser light corresponding to an image of each color component. The positive charge is generated in the charge generation layer of the photoreceptor drum 413 and is transported to the surface of the charge transport layer, by which a surface charge (negative charge) of the photoreceptor drum 413 is neutralized. An electrostatic latent image of each color component is formed on the surface of the photoreceptor drum 413 due to a potential difference from surroundings.

The developer is, for example, a two-component developer, and visualizes the electrostatic latent image by attaching the toner of each color component to the surface of the photoreceptor drum 413 to form a toner image.

The drum cleaner includes a drum cleaning blade or the like that comes into sliding contact with the surface of the photoreceptor drum 413, and, after the primary transfer, removes transfer residual toner remaining on the surface of the photoreceptor drum 413.

The intermediate transfer unit 42 includes the intermediate transfer belt 421, a primary transfer roller (not shown), a plurality of support rollers (not shown), a secondary transfer roller 424, a belt cleaner (not shown), and the like.

The intermediate transfer belt 421 is formed by an endless belt, and is stretched in a loop shape around the plurality of support rollers. At least one of the plurality of support rollers includes a drive roller, and the other support rollers include a driven roller. For example, the drive roller is preferably a roller disposed on a downstream side of the primary transfer roller for the K component in a belt running direction. Thus, running speed of the belt in a primary transferrer can be easily kept constant. As the drive roller rotates, the intermediate transfer belt 421 runs at a constant speed in a direction of the arrow A.

The primary transfer roller is disposed on an inner peripheral surface side of the intermediate transfer belt 421 so as to face the photoreceptor drums 413 of the respective color components. Primary transfer nips for transferring the toner images from the photoreceptor drums 413 to the intermediate transfer belt 421 are formed by the primary transfer rollers being pressed against the respective photoreceptor drums 413 with the intermediate transfer belt 421 interposed therebetween.

The secondary transfer roller 424 is disposed on an outer peripheral surface side of the intermediate transfer belt 421 while facing a backup roller 423B disposed on the downstream side of the drive roller in the belt running direction. A secondary transfer nip for transferring the toner images from the intermediate transfer belt 421 onto the paper is formed by the secondary transfer roller 424 being pressed against a backup roller (not shown) with the intermediate transfer belt 421 interposed therebetween.

When the intermediate transfer belt 421 passes through the primary transfer nips, the toner images on the photoreceptor drums 413 are sequentially superimposed and primarily transferred onto the intermediate transfer belt 421. Specifically, primary transfer bias is applied to the primary transfer rollers, and charge with polarity opposite to polarity of the toner is applied to a back-surface side of the intermediate transfer belt 421 (side in contact with the primary transfer roller), by which the toner images are electrostatically transferred onto the intermediate transfer belt 421.

Thereafter, when the paper passes through the secondary transfer nip, the toner images on the intermediate transfer belt 421 are secondarily transferred onto the paper. Specifically, secondary transfer bias is applied to the secondary transfer roller 424, and charge with polarity opposite to polarity of the toner is applied to a back-surface side of the paper (side in contact with the secondary transfer roller 424), by which the toner images are electrostatically transferred onto the paper. The paper onto which the toner images have been transferred is conveyed toward the fixer 60.

The belt cleaner (not shown) includes a belt cleaning blade or the like that comes into sliding contact with a surface of the intermediate transfer belt 421, and, after the secondary transfer, removes transfer residual toner remaining on the surface of the intermediate transfer belt 421. Note that, instead of the secondary transfer roller 424, a secondary transfer belt may be adopted by being stretched in a loop shape around the plurality of support rollers including a secondary transfer roller (so-called belt-type secondary transfer unit).

The fixer 60 includes an upper fixer 60A having fixing-surface-side members disposed on a fixing surface (front surface on which the toner images are formed) side of the paper, a lower fixer 60B having a back-surface-side support member disposed on a back surface (surface opposite to the fixing surface) side of the paper, a heating source 60C, and the like. When the back-surface-side support member is pressed against a fixing-surface-side member, a fixing nip that nips and conveys the paper is formed.

After the toner images are secondarily transferred onto the paper, the fixer 60 fixes the toner images on the conveyed paper by heating and pressurizing the paper with the fixing nip. The fixer 60 is disposed as a unit in a fixing device, that is, a housing.

The paper conveyor 50 includes a paper feeder 51, a paper ejector 52, a conveyance path unit 53, and the like. The paper feeder 51 includes a delivery roller 51*a* that delivers, to a downstream side, the paper (continuous paper) wound in a roll.

The paper delivered to the downstream side of the paper feeder 51 is conveyed to the image former 40 by the conveyance path unit 53 via the paper pre-heater 80 (described later). In the image former 40, the toner images on the intermediate transfer belt 421 are secondarily transferred collectively onto one surface of the paper, and a fixing process is performed in the fixer 60. The paper ejector 52 includes a winding roller 52*a* that winds, into a roll, the paper on which an image is formed. The conveyance path unit 53 includes conveyance rollers 53*a* that hold and convey paper. Note that the conveyance path unit 53 may include a paper tension application roller (not shown) that applies tension to the paper and a skew adjustment roller (not shown) that adjusts skew of the paper.

Figure 3:
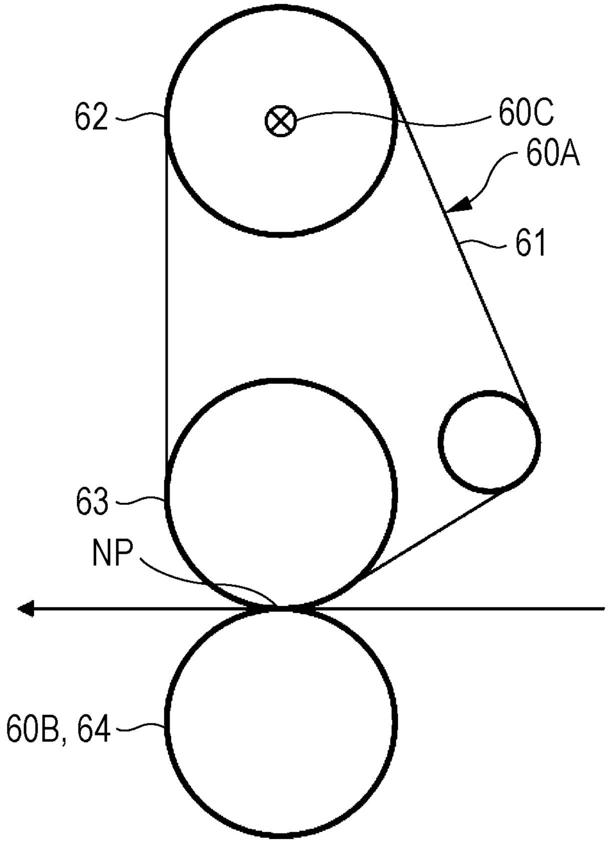
FIG. 3 is a diagram schematically showing a configuration of a fixer.

Next, a configuration of the fixer 60 will be described in more detail with reference to FIG. 3. FIG. 3 is a diagram schematically showing the fixer 60. In the present embodiment, a fixing method is limited to a belt fixing method. However, the fixing method is not limited to the belt fixing method in the present invention.

The upper fixer 60A includes a fixing belt 61 having an endless shape, a heating roller 62, and an upper pressure roller 63 (belt heating type), which are the fixing-surface-side members. The fixing belt 61 is stretched between the heating roller 62 and the upper pressure roller 63 under a predetermined tension.

A main body of the fixing belt 61 includes polyimide (PI), for example. An outer peripheral surface of the main body is covered with heat-resistant silicone rubber and serves as an elastic layer. Further, a surface layer of the fixing belt 61 is covered or coated with a tube of perfluoroalkoxy (PFA) that is heat-resistant resin.

The fixing belt 61 comes into contact with the paper on which a toner image is formed, and heats and fixes the toner image on the paper in a predetermined temperature range.

The heating roller 62 heats the fixing belt 61. The heating roller 62 incorporates the heating source 60C that is, for example, a halogen heater that heats the fixing belt 61. The heating roller 62 has a configuration in which an outer peripheral surface at a cylindrical core metal formed of aluminum or the like is covered with a resin layer coated with PTFE.

Temperature of the heating source 60C is controlled by the controller 101. The heating roller 62 is heated by the heating source 60C, and as a result, the fixing belt 61 is heated. Thus, the toner formed on the paper is heated. The controller 101 controls toner fixing temperature by controlling the heating source 60C on the basis of, for example, an on/off pattern in a predetermined duty ratio in half-wave units.

The upper pressure roller 63 is formed by covering, with an elastic layer, a solid core metal formed of metal such as iron, for example. As a material of the elastic layer, for example, heat-resistant silicone rubber can be used. In addition, as the elastic layer, the heat-resistant silicone rubber can be covered with a resin layer coated with PTFE that is heat-resistant low friction resin.

The lower fixer 60B includes a lower pressure roller 64 that constitutes a back-surface-side support member (roller pressure method). The lower pressure roller 64 is formed by covering, with an elastic layer, an outer peripheral surface of a base material layer including aluminum (Al). As a material of the elastic layer, for example, heat-resistant silicone rubber can be used. In addition, as the elastic layer, the heat-resistant silicone rubber can be covered with a resin layer of a PFA tube as a surface release layer.

A heating source such as a halogen heater may be incorporated in the lower pressure roller 64. The lower pressure roller 64 is heated by the heating source generating heat. Thus, the toner formed on the paper is heated. The controller 101 may control toner fixing temperature by controlling the heating source on the basis of, for example, an on/off pattern in a predetermined duty ratio in half-wave units.

The lower pressure roller 64 is pressed against the upper pressure roller 63 at a predetermined fixing load via the fixing belt 61. In this manner, a fixing nip NP that nips and conveys the paper is formed between the upper pressure roller 63 and the fixing belt 61, and the lower pressure roller 64.

The lower pressure roller 64 is connected to a motor, a gear, or the like (not shown), and drive force of the motor is transmitted to the lower pressure roller 64. The controller 101 outputs a drive signal to the motor that drives the lower pressure roller 64 to control peripheral speed of the lower pressure roller 64.

In the fixer 60, the upper fixer 60A, the lower fixer 60B, and the heating source 60C fix an unfixed toner image on the paper by conveying the paper while heating and pressurizing the paper with the fixing nip NP.

Meanwhile, in a case where the paper is thick paper, tack paper, or the like for example, temperature of the front surface of the paper does not sufficiently rise, and fixing under offset may occur, even if, between the intermediate transfer unit 42 and the fixer 60, to heat the paper, the paper pre-heating member is brought into contact with the back surface of the paper. If an amount of heating from the back-surface side is increased so that fixing under offset does not occur, image unevenness due to toner blister may occur at a time of the fixing, or paper blister may occur. If, between the intermediate transfer unit 42 and the fixer 60, the paper pre-heating member is brought into contact with the paper, disturbance of an unfixed toner image may occur.

In the present embodiment, in order to reduce occurrence of image formation failure such as fixing under offset, image unevenness, disturbance of an unfixed toner image, or the like, the paper pre-heater 80 is disposed on an upstream side of the intermediate transfer unit 42 (hereinafter, simply referred to as "upstream side") in the paper conveyance direction, and is disposed on a downstream side of the paper feeder 51 (hereinafter, simply referred to as "downstream side") in the paper conveyance direction.

Figure 4:
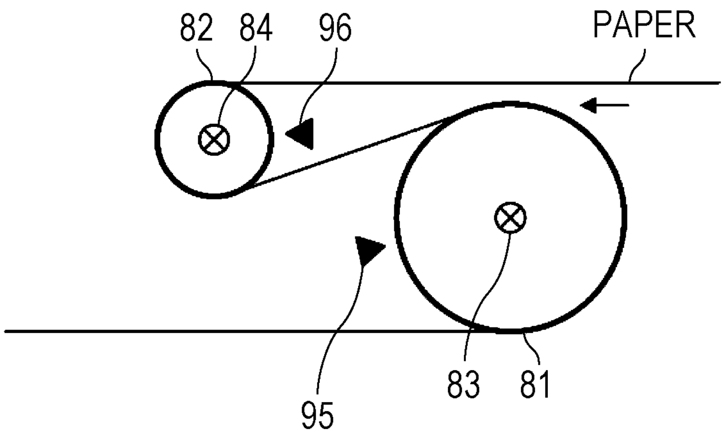
FIG. 4 is an enlarged view showing an example of a configuration of a paper pre-heater according to the present embodiment.

FIG. 4 is an enlarged view showing an example of a configuration of the paper pre-heater 80 according to the present embodiment. As shown in FIG. 4, the paper pre-heater 80 includes a front-surface-side roller 81 and a back-surface-side roller 82. The front-surface-side roller 81 is disposed on a downstream side of a back-surface-side roller 82. Here, the front surface of the paper corresponds to an "image formation surface" in the present invention.

The front-surface-side roller 81 is disposed so as to come into contact with the front surface of the paper. The front-surface-side roller 81 incorporates a front-surface-side heating source 83 (a halogen heater, for example) that heats the front-surface side of the paper. A diameter of the front-surface-side roller 81 is larger than a diameter of the back-surface-side roller 82. A front-surface-side roller temperature sensor 95 (described later) that detects temperature of the front-surface-side roller 81 is disposed in a vicinity of the front-surface-side roller 81.

The back-surface-side roller 82 is disposed so as to come into contact with the back surface of the paper. The back-surface-side roller 82 incorporates a back-surface-side heating source 84 (a halogen heater, for example) that heats the back-surface side of the paper. The back-surface-side roller 82 is disposed at a position not facing the front-surface-side roller 81 with the paper interposed therebetween. Thus, a paper nip is not formed and the paper is not nipped. Therefore, deformation of the paper, such as a wrinkle is less likely to occur.

A back-surface-side roller temperature sensor 96 (described later) that detects temperature of the back-surface-side roller 82 is disposed in a vicinity of the back-surface-side roller 82.

As shown in FIG. 4, the paper sent out from the paper feeder 51 is wound around the back-surface-side roller 82 in a counterclockwise direction. Then, the paper is passed from the back-surface-side roller 82 to the front-surface-side roller 81, and further wound around the front-surface-side roller 81 in a clockwise direction. A circumferential length L1 in which the front-surface-side roller 81 and the front surface of the paper come into contact with each other is a length from an eleven o'clock position to six o'clock position of the front-surface-side roller 81 in the clockwise direction. A circumferential length L2 in which the back-surface-side roller 82 and the back surface of the paper come into contact with each other is a length from a twelve o'clock position to five o'clock position of the back-surface-side roller 82 in the counterclockwise direction. Because the diameter of the front-surface-side roller 81 is larger than the diameter of the back-surface-side roller 82, the circumferential length L1 is equal to or greater than the circumferential length L2 (L1≥L2). Thus, the temperature of the back surface of the paper heated by the back-surface-side roller 82 can be set lower than the temperature of the front surface of the paper heated by the front-surface-side roller 81.

Figure 5:
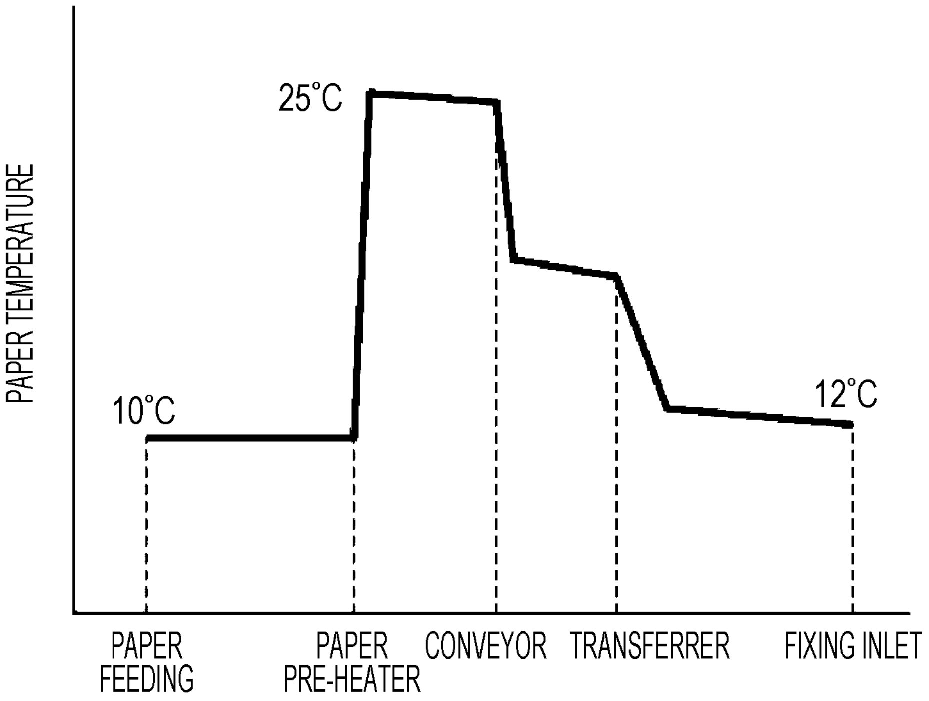
FIG. 5 is a diagram showing paper temperature at each paper position immediately after image formation starts.
Figure 6:
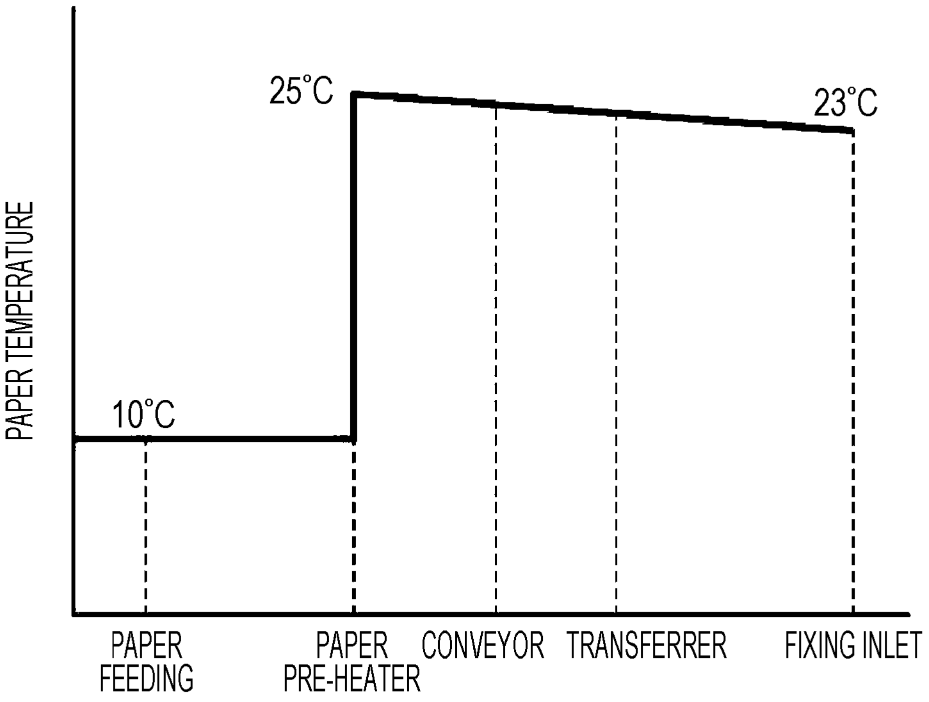
FIG. 6 is a diagram showing the paper temperature at each paper position five minutes after the image formation starts.
Figure 7:
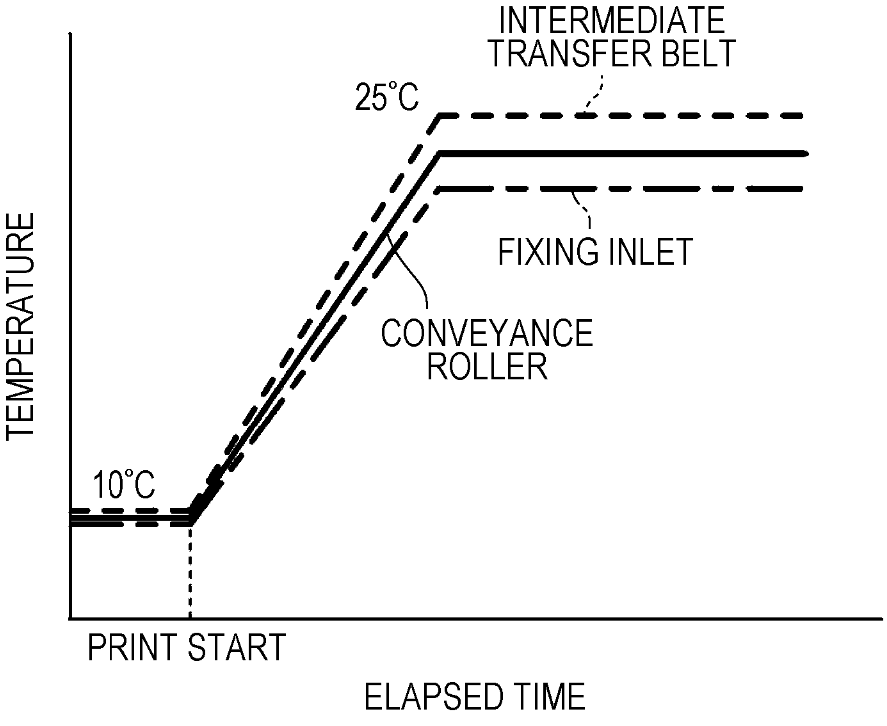
FIG. 7 is a diagram showing a relationship between paper temperature and an elapsed time from the start of the image formation, for each position on a conveyance path.

FIG. 5 is a diagram showing paper temperature at each paper position immediately after image formation starts. FIG. 6 is a diagram showing the paper temperature at each paper position five minutes after the image formation starts. FIG. 7 is a diagram showing a relationship between paper temperature and an elapsed time from the start of the image formation, for each position on a conveyance path. "paper feeding", "paper pre-heater", "conveyor", "transferrer", and "fixing inlet" shown in FIGS. 5 and 6 indicate positions (paper positions) of the "paper feeder 51", "front-surface-side roller 81", "conveyance rollers 53*a*", "intermediate transfer unit 42", and "inlet of the fixer 60", respectively.

In a case where a machine and the paper are left in a low temperature environment, for example at 10° C., for a long time, the machine and the paper are also cooled to 10° C. If image formation is started in this low-temperature environment, the temperature of the paper at the inlet of the fixer falls to 12° C. even in a case where the paper temperature is raised to 25° C. by the paper pre-heater 80, because the paper is cooled by the conveyance rollers 53*a* disposed between the paper pre-heater 80 and the intermediate transfer unit 42, and by the intermediate transfer belt 421 (refer to FIG. 5). When a predetermined time (five minutes, for example) elapses from the start of image formation, the conveyance rollers 53*a* and the intermediate transfer belt 421 are warmed by the paper. Therefore, at each of the paper positions, the paper temperature does not fall so much from the temperature of the paper pre-heater 80 (refer to FIGS. 6 and 7).

Therefore, in the present embodiment, after instruction for the image formation, it is determined whether or not the temperature of the fixing belt 61 (hereinafter, referred to as "fixing temperature") detected by a fixing-belt temperature sensor 93 (refer to FIG. 8) is equal to or lower than a predetermined temperature Tfs (15° C., for example). Then, in a case where the fixing temperature is equal to or lower than the predetermined temperature Tfs, paper pre-heating processing for heating the paper is performed at a time of warming up the fixer 60 (warm-up time).

Figure 8:
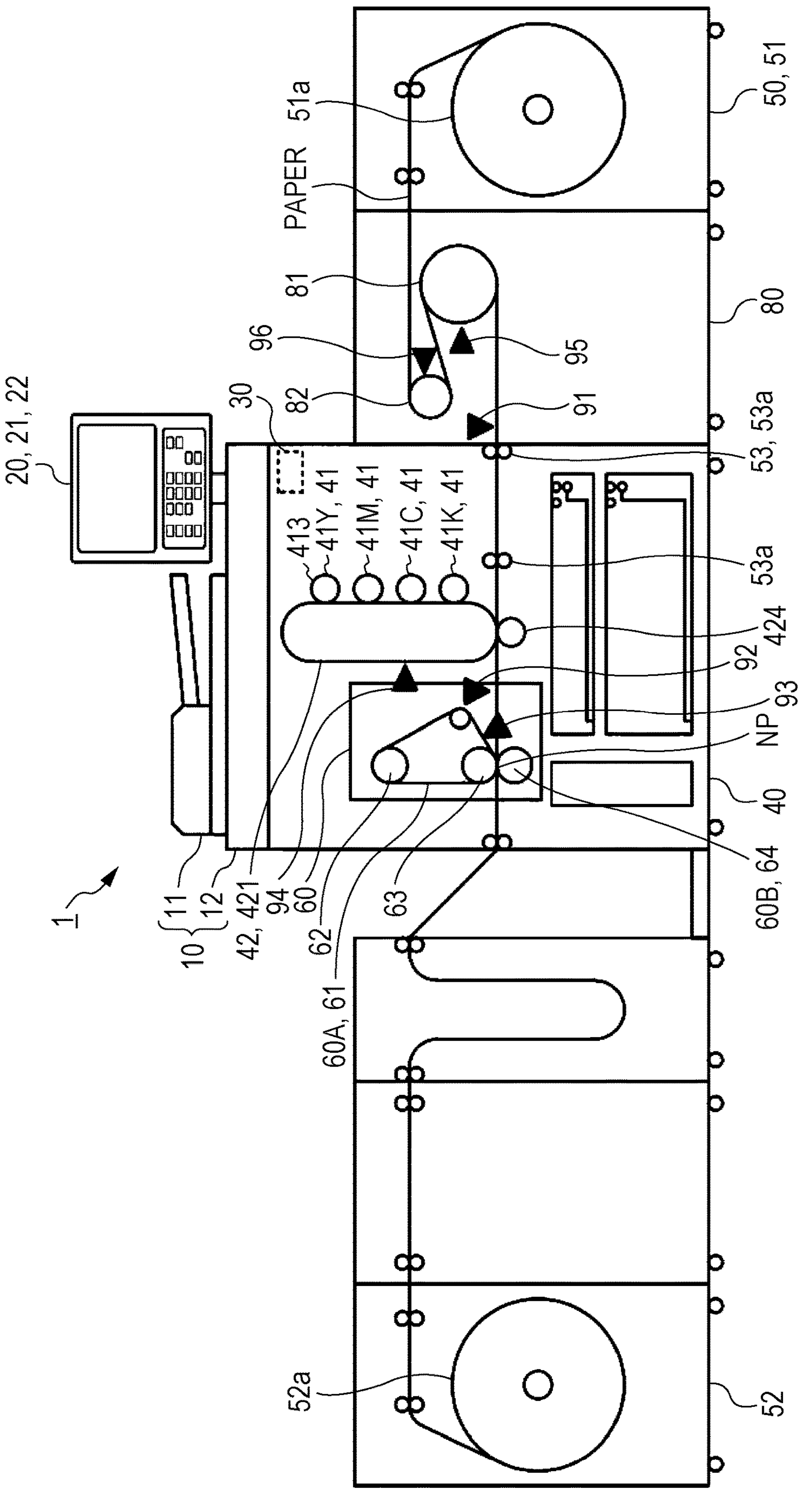
FIG. 8 is a diagram showing an example of an arrangement configuration of temperature sensors.

FIG. 8 is a diagram showing an example of an arrangement configuration of temperature sensors according to the present embodiment. As shown in FIG. 8, a paper pre-heater outlet paper temperature sensor 91, a fixer-inlet paper temperature sensor 92, the fixing-belt temperature sensor 93, an intermediate-transfer-belt temperature sensor 94, the front-surface-side roller temperature sensor 95, and the back-surface-side roller temperature sensor 96 are disposed at predetermined positions of the image formation apparatus 1.

The paper pre-heater outlet paper temperature sensor 91 is a contactless temperature sensor, and detects the temperature of the front surface of the paper at an outlet of the paper pre-heater 80. The fixer-inlet paper temperature sensor 92 is a contactless temperature sensor, and detects the temperature of the front surface of the paper at the inlet of the fixer 60.

The fixing-belt temperature sensor 93 detects the temperature of the fixing belt 61 (fixing temperature). The intermediate-transfer-belt temperature sensor 94 detects temperature of the intermediate transfer belt 421. The front-surface-side roller temperature sensor 95 detects the temperature of the front-surface-side roller 81. The back-surface-side roller temperature sensor 96 detects the temperature of the back-surface-side roller 82. The controller 101 acquires respective detection results from the paper pre-heater outlet paper temperature sensor 91, the fixer-inlet paper temperature sensor 92, the fixing-belt temperature sensor 93, the intermediate-transfer-belt temperature sensor 94, the front-surface-side roller temperature sensor 95, and the back-surface-side roller temperature sensor 96.

In a case where the fixing temperature is equal to or lower than the predetermined temperature Tfs, the controller 101 executes paper pre-heating control and warm-up control for the fixer 60 in parallel. For example, the paper pre-heating control includes (1) transfer press control, (2) control of the paper conveyor 50, and (3) lighting control for each of the front-surface-side heating source 83 and the back-surface-side heating source 84. The warm-up control for the fixer 60 includes (4) drive speed control for the upper pressure roller 63 and the lower pressure roller 64, and (5) lighting control for the heating source 60C.

(1) Transfer Press Control

The controller 101 executes transfer press control. Thus, the secondary transfer roller 424 is pressed against the backup roller 423B with the intermediate transfer belt 421 interposed therebetween. As a result, the paper conveyed from the paper feeder 51 via the conveyance rollers 53*a* can be brought into contact with the intermediate transfer belt 421 and the secondary transfer roller 424.

(2) Control of Paper Conveyor 50

The controller 101 controls the paper conveyor 50 so that a paper conveyance speed at a time of paper pre-heating is a predetermined speed WVph. Note that the predetermined speed WVph at the time of paper pre-heating is set to a speed lower than a paper conveyance speed VP at a time of the image formation. Thus, the paper is conveyed at a low speed. Therefore, waste paper can be reduced, and the paper can be efficiently heated.

In a case where the temperature of the front surface of the paper at the inlet of the fixer 60 is equal to or higher than a predetermined temperature WTpa2, the temperature of the front surface of the paper being detected by the fixer-inlet paper temperature sensor 92, the controller 101 controls the paper conveyor 50 to stop conveyance of the paper. Thus, the intermediate transfer belt 421, the secondary transfer roller 424, and the conveyance rollers 53*a*, which come in contact with the paper on the upstream side of the fixer 60, are sufficiently warmed. As a result, it is possible to reduce a chance of a decrease in the paper temperature immediately after the start of the image formation switched from warm-up (paper pre-heating).

(3) Lighting Control for each of Front-Surface-Side Heating Source 83 and Back-Surface-Side Heating Source 84.

The controller 101 performs lighting control for the front-surface-side heating source 83 so that the temperature of the front-surface-side roller 81 is at a predetermined temperature WTph1, and performs lighting control for the back-surface-side heating source 84 so that the temperature of the back-surface-side roller 82 is at a predetermined temperature WTph2. The predetermined temperature WTph1 is set to a temperature higher than the predetermined temperature WTph2. Thus, in heating the paper, the temperature of the back surface of the paper can be set lower than the temperature of the front surface of the paper.

The paper conveyed from the paper pre-heater 80 via the conveyance rollers 53*a* warms the conveyance rollers 53*a* and the intermediate transfer belt 421. However, if the temperature of the intermediate transfer belt 421 is too high, cleaned toner is welded. The controller 101 performs lighting control for the front-surface-side heating source 83 and the back-surface-side heating source 84 so that temperature of the intermediate transfer belt 421 detected by the intermediate-transfer-belt temperature sensor 94 does not exceed a predetermined temperature Tbs. Thus, it is possible to reduce a chance of welded toner.

In a case where the temperature of the front surface of the paper at the inlet of the fixer 60 is equal to or higher than a predetermined temperature WTpa2, the temperature of the front surface of the paper being detected by the fixer-inlet paper temperature sensor 92, the controller 101 turns off lighting of the front-surface-side heating source 83 and the back-surface-side heating source 84.

Next, the warm-up control for the fixer 60 will be described.

(4) Drive Speed Control for Upper Pressure Roller 63 and Lower Pressure Roller 64

The controller 101 performs control so that drive speeds of the upper pressure roller 63 and the lower pressure roller 64 are at a predetermined speed WVf.

(5) Lighting Control for Heating Source 60C

The controller 101 performs lighting control for the heating source 60C so that the fixing temperature is at a predetermined temperature WTf. In a case where the fixing temperature is equal to or higher than the predetermined temperature WTf, the controller 101 determines whether or not an elapsed time from the start of the warm-up control for the fixer 60 (warm-up time) is equal to or longer than a predetermined time TMw. In a case where the warm-up time is equal to or longer than the predetermined time TMw, the controller 101 ends the warm-up control for the fixer 60. Thus, the fixing temperature is set to a predetermined temperature PTf.

As described above, in a case where the fixing temperature is equal to or lower than the predetermined temperature Tfs, the controller 101 executes the paper pre-heating control and the warm-up control for the fixer 60 in parallel. Thereafter, the controller 101 executes image formation control.

Figure 9:
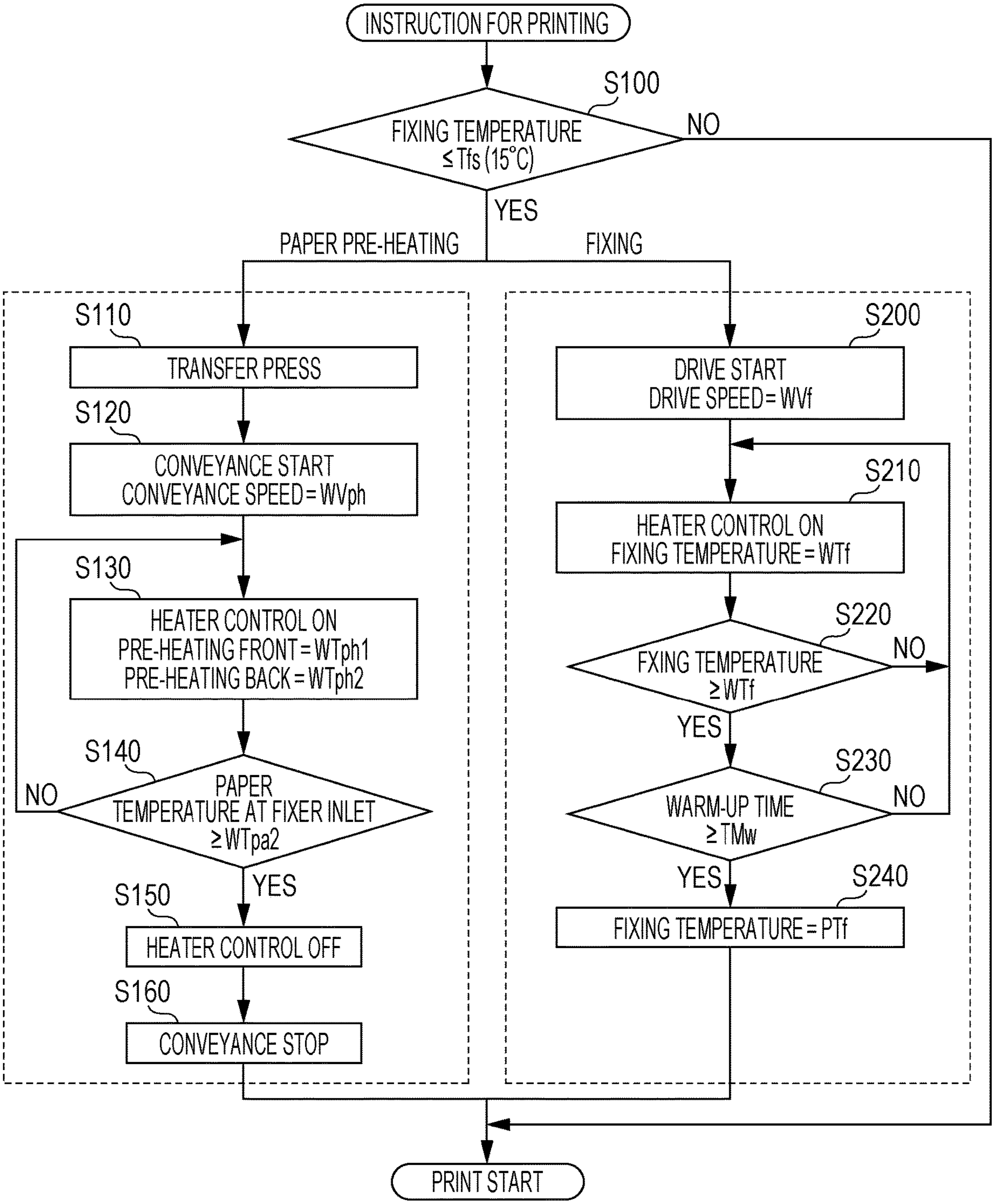
FIG. 9 is a flowchart showing an example of operation of the image formation apparatus according to the present embodiment.

Next, an example of operation of the image formation apparatus 1 according to the present embodiment will be described with reference to FIG. 9. FIG. 9 is a flowchart showing an example of operation of the image formation apparatus 1 according to the present embodiment. This flow is started by an image formation instruction input to the image formation apparatus 1. In FIG. 9, the temperature of the front-surface-side roller 81 is shown as "pre-heating front". The temperature of the back-surface-side roller 82 is shown as "pre-heating back".

First, in step S100, the controller 101 determines whether or not the fixing temperature is equal to or lower than the predetermined temperature Tfs (15° C., for example).

In a case where the fixing temperature is equal to or lower than the predetermined temperature Tfs (step S100: YES), the paper pre-heating control (steps S110 to S160) and the warm-up control for the fixer 60 (steps S200 to S240) are performed in parallel.

In step S110, the controller 101 executes transfer press control. Thus, the paper can be brought into contact with the intermediate transfer belt 421 and the secondary transfer roller 424.

In step S120, the controller 101 controls the paper conveyor 50 so that the paper conveyance speed is at the predetermined speed WVph.

In step S130, the controller 101 controls the front-surface-side heating source 83 so that the temperature of the front-surface-side roller 81 is at the predetermined temperature WTph1, and controls the back-surface-side heating source 84 so that the temperature of the back-surface-side roller 82 is at the predetermined temperature WTph2.

Next, in step S140, the controller 101 determines whether or not the paper temperature at the inlet of the fixer 60 (fixer-inlet paper temperature shown in FIG. 9) is equal to or higher than the predetermined temperature WTpa2. In a case where the paper temperature is equal to or higher than the predetermined temperature WTpa2 (step S140: YES), the processing proceeds to step S150. In a case where the paper temperature is lower than the predetermined temperature WTpa2 (step S140: NO), the processing returns to step before step S130.

In step S150, the controller 101 turns off the front-surface-side heating source 83 and the back-surface-side heating source 84.

Next, in step S160, the controller 101 controls the paper conveyor 50 so that the conveyance of the paper is stopped. Thereafter, the image formation is started. At the time of the image formation, a conveyance speed in paper pre-heating is controlled to the same conveyance speed as a conveyance speed in the image formation. In addition, the front-surface-side heating source 83 and the back-surface-side heating source 84 are controlled so that the temperatures of the front-surface-side roller 81 and back-surface-side roller 82 are set to PTph1 and PTph2, respectively.

The controller 101 executes the following control in parallel with the above paper pre-heating control (steps S110 to S160). In step S200, the controller 101 performs control so that drive speeds of the upper pressure roller 63 and the lower pressure roller 64 are at the predetermined speed WVf.

Next, in step S210, the controller 101 performs lighting control for the heating source 60C so that the fixing temperature is at a predetermined temperature WTf.

Next, in step S220, the controller 101 determines whether or not the fixing temperature is equal to or higher than the predetermined temperature WTf. In a case where the fixing temperature is equal to or higher than the predetermined temperature WTf (step S220: YES), the processing proceeds to step S230. In a case where the fixing temperature is lower than the predetermined temperature WTf (step S220: NO), the processing returns to step before step S210.

In step S230, the controller 101 determines whether or not an elapsed time from start of the warm-up (warm-up time) is equal to or longer than the predetermined time TMw. In a case where the warm-up time is equal to or longer than the predetermined time TMw (step S230: YES), the processing proceeds to step S240. In a case where the warm-up time is shorter than the predetermined time TMw (step S230: NO), the processing returns to step before step S210.

In step S240, the fixing temperature is set to the predetermined temperature PTf. Thereafter, if the paper pre-heating is at step S160, the image formation is started. If the paper pre-heating has not yet reached step S100, the image formation is started after step S160 is reached.

The image formation apparatus 1 according to the above embodiment includes the intermediate transfer unit 42 that forms the toner image on the front surface of the paper, the fixer 60 that fixes the toner image onto the paper, the paper conveyor 50 that conveys the paper between an upstream side of the intermediate transfer unit 42 and a downstream side of the fixer 60 in the paper conveyance direction, and the paper pre-heater 80 that heats the front-surface side of the paper on the upstream side of the intermediate transfer unit 42 in the paper conveyance direction.

With the above configuration, the front-surface-side roller 81 comes into contact with the front surface of the paper on the upstream side of the intermediate transfer unit 42, and the temperature of the front surface of the paper sufficiently rises. Therefore, it is possible to reduce occurrence of fixing under offset and image unevenness. In addition, because the front-surface-side roller 81 and the back-surface-side roller 82 come into contact with the paper on the upstream side of the intermediate transfer unit 42, it is possible to reduce a chance of disturbance of an unfixed toner image.

In the image formation apparatus 1 according to the above embodiment, the paper pre-heater 80 heats the front-surface side of the paper at time of warm-up of the fixer. By effectively using time for conventionally performed fixing warm-up as a time for paper pre-heating, it is possible to reduce a chance of a decrease in productivity.

In the image formation apparatus 1 according to the above embodiment, a paper conveyance speed at the time of warm-up is lower than a paper conveyance speed at the time of the image formation in which the toner image is formed on the front surface of the paper. Thus, it is possible to shorten length of waste paper.

In the image formation apparatus 1 according to the above embodiment, the diameter of the front-surface-side roller 81 is larger than the diameter of the back-surface-side roller 82. Thus, the circumferential length L1 in which the front-surface-side roller 81 is in contact with the front surface of the paper is equal to or longer than the circumferential length L2 in which the back-surface-side roller 82 is in contact with the back surface of the paper. Thus, the temperature of the back surface of the paper heated by the back-surface-side roller 82 can be set lower than the temperature of the front surface of the paper heated by the front-surface-side roller 81. As a result, the temperature on the back-surface side of the paper can remain low. Therefore, the paper can be efficiently heated while reducing a chance of toner blister or paper blister.

In the image formation apparatus 1 according to the above embodiment, the paper pre-heater 80 includes the front-surface-side roller 81 disposed so as to come into contact with the front surface of the paper, and the back-surface-side roller 82 disposed, at a position not facing the front-surface-side roller 81 with the paper interposed therebetween so as to come into contact with the back surface of the paper. Thus, the paper is not sandwiched between the front-surface-side roller 81 and the back-surface-side roller 82. Therefore, it is possible to reduce a chance of deformation of the paper, such as a wrinkle.

In the image formation apparatus 1 according to the above embodiment, an amount the paper pre-heater 80 heats the front-surface side of the paper is equal to or larger than an amount the paper pre-heater 80 heats the back-surface side of the paper. Thus, the front-surface side of the paper can be efficiently heated. In addition, the temperature on the back-surface side does not rise excessively. Therefore, it is possible to reduce a chance of toner blister or paper blister.

First Modification

Figure 10:
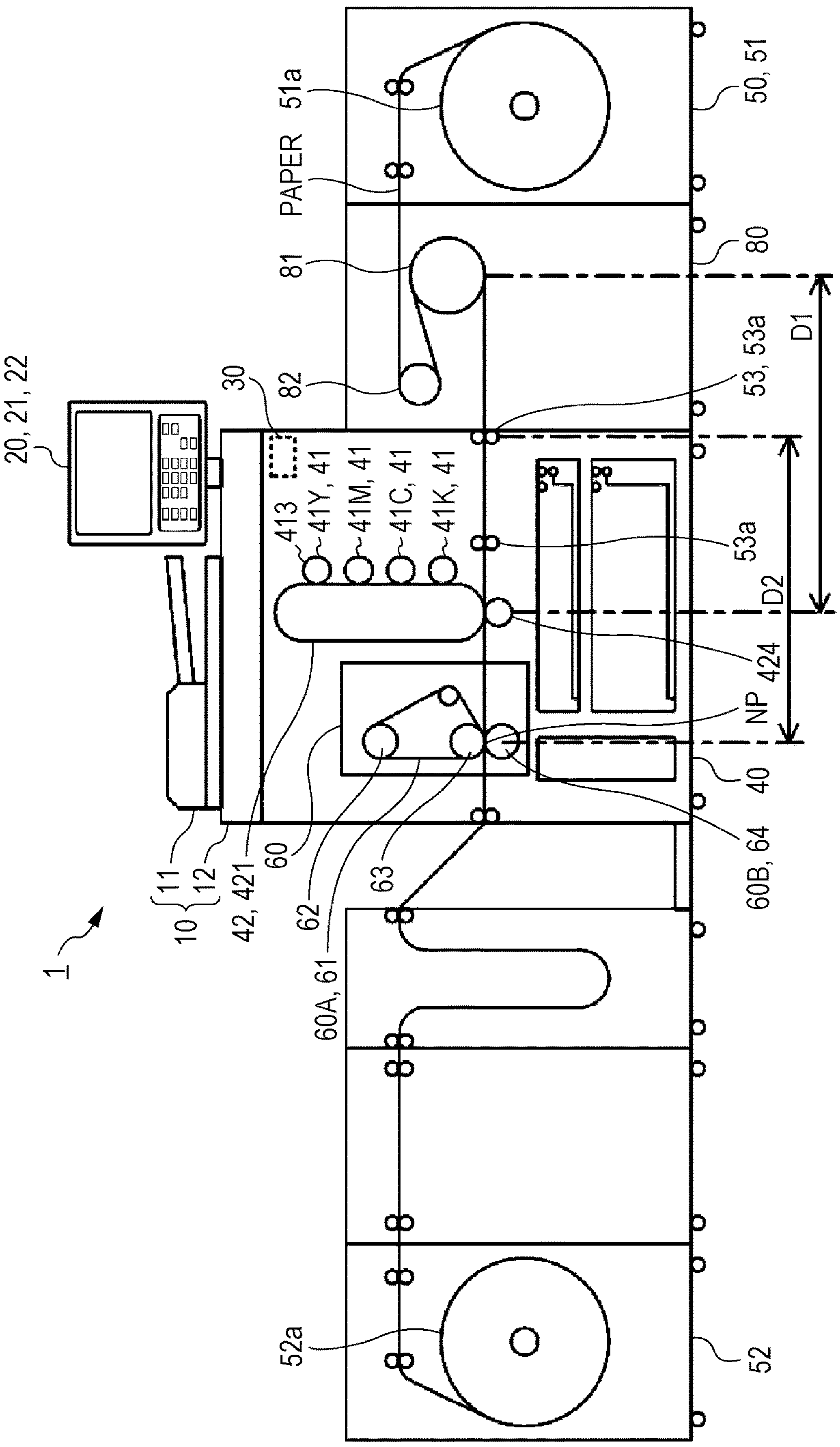
FIG. 10 is a diagram showing a predetermined distance of repeatedly conveyed paper in the image formation apparatus according to a first modification, at a time of paper pre-heating.

Next, the image formation apparatus 1 according to a modification of the present embodiment will be described with reference to FIG. 10. FIG. 10 is a diagram showing a predetermined distance of repeatedly conveyed paper in the image formation apparatus 1 according to a first modification, at the time of the paper pre-heating. In the above embodiment, in order to shorten the length of the waste paper, for example, the paper conveyance speed at the time of the warm-up (at the time of the paper pre-heating executed in parallel) is set slower than the paper conveyance speed at the time of the image formation. Meanwhile, in the first modification, in order to shorten the length of the waste paper, the paper is repeatedly conveyed at the time of the paper pre-heating. Specifically, the paper conveyor 50 conveys the paper, which is continuous paper, in a reciprocating manner for the predetermined distance or longer at the time of paper pre-heating. In addition to the paper pre-heater, the fixer also heats the paper. With this arrangement, the length of the waste paper can be further shortened. The predetermined distance of the conveyance in the reciprocating manner is determined by a positional relationship among the paper pre-heater, the fixer, an intermediate transferrer, and the conveyor.

The predetermined distance is set as follows. First, a distance D1 between the front-surface-side roller 81 and the intermediate transfer unit 42 is compared with a distance D2 between the fixer 60 and a conveyance roller 53*a* on an uppermost stream. Here, the "the conveyance roller on the uppermost stream" refers to a conveyance roller positioned on an uppermost stream side, among a plurality of conveyance rollers disposed between the fixer 60 and the front-surface-side roller 81.

Next, in a case where the distance D1 is equal to or longer than the distance D2 (D1≥D2), if the predetermined distance is set to the shorter distance D2, the paper heated by the front-surface-side roller 81 does not reach the intermediate transfer unit 42. Therefore, the intermediate transfer unit 42 is not warmed by the paper heated by the front-surface-side roller 81. Meanwhile, the paper heated by the fixer 60 is warmed. If the predetermined distance is set to the longer distance D1 or longer, the paper heated by the front-surface-side roller 81 reaches the intermediate transfer unit 42. Therefore, the intermediate transfer unit 42 is warmed by the paper heated by the front-surface-side roller 81. The paper is also warmed by the paper heated by the fixer 60. As a result, the intermediate transfer unit 42 and the conveyance rollers 53*a* can be more efficiently warmed, the length of the waste paper can be shortened, and the paper pre-heating time at the time of warm-up can be shortened. Then, even if an image is formed in a state where the machine or the paper is left at a low temperature, the paper is conveyed to the fixer 60 without the temperature of the paper falling at the intermediate transfer unit 42. Therefore, it is possible to reduce occurrence of fixing under offset.

Next, in a case where the distance D1 is shorter than the distance D2 (D1<D2), if the predetermined distance is set to the shorter distance D1, the paper heated by the front-surface-side roller 81 reaches the intermediate transfer unit 42. However, the paper heated by the fixer 60 does not reach the intermediate transfer unit 42 or a conveyance roller 53*a*. If the predetermined distance is set to the longer distance D2 or longer, the intermediate transfer unit 42 and the conveyance rollers 53*a* are warmed by the paper heated by both the front-surface-side roller 81 and the fixer 60.

In the above embodiment, in a case where the paper pre-heating is executed at the time of warm-up, the fixer 60 does not heat the front-surface side of the paper. Meanwhile, in the first modification, the front-surface side of the paper is heated. Specifically, the fixer 60 presses the paper at the time of the warm-up, and heats and conveys the paper with the fixing nip NP. Thus, the paper is heated by both the paper pre-heater 80 and the fixer 60. Therefore, it is possible to warm the intermediate transfer unit 42 and the conveyance rollers 53*a* more efficiently. Note that the fixer 60 heats the paper at a reciprocation cycle the same as a reciprocation cycle of the paper pre-heater 80.

Figure 11:
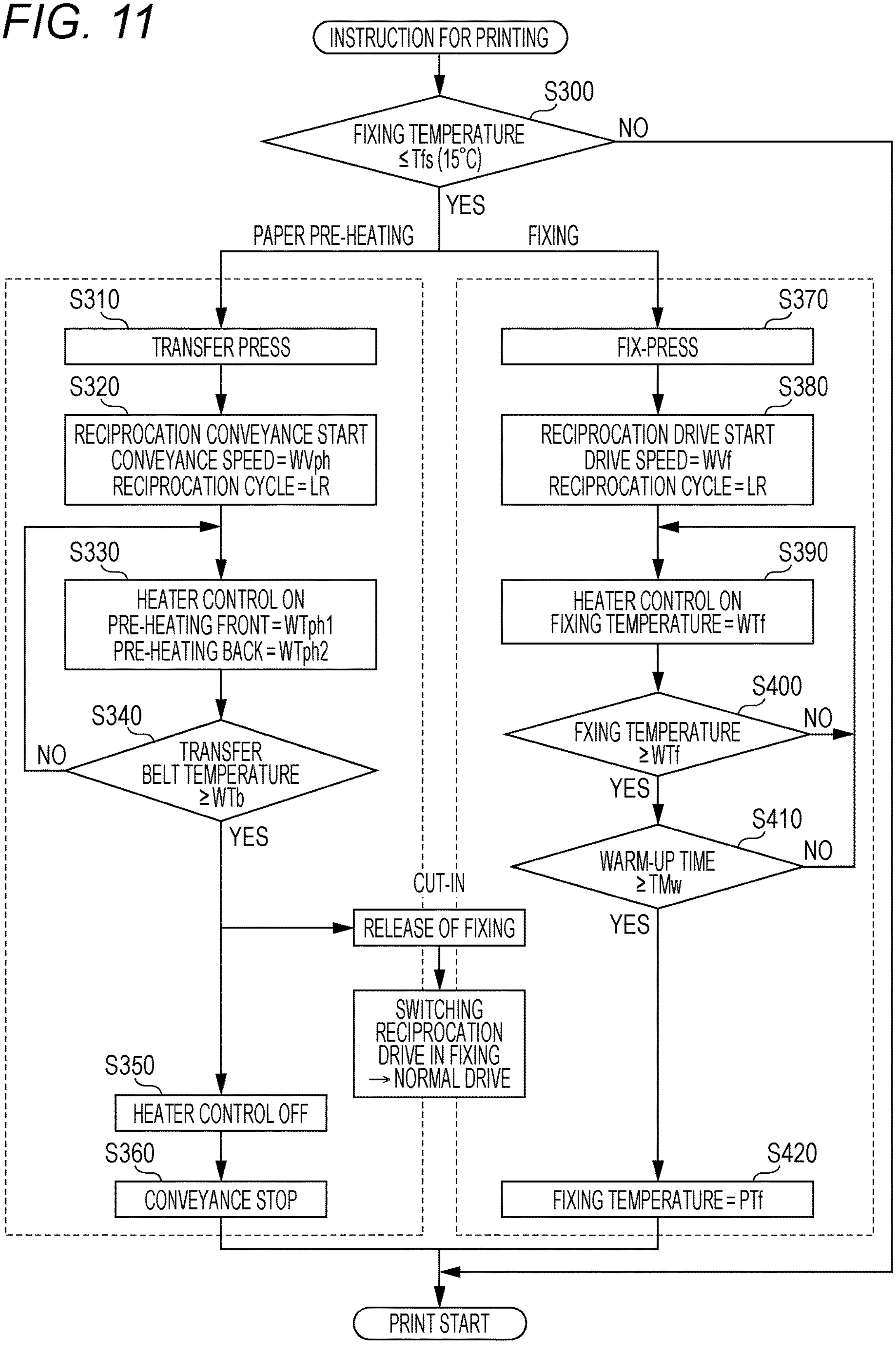
FIG. 11 is a flowchart showing an example of operation of the image formation apparatus according to the first modification.

Next, operation of the image formation apparatus 1 according to the first modification will be described with reference to FIG. 11. FIG. 11 is a flowchart showing an example of operation of the image formation apparatus 1 according to the first modification. In FIG. 11, the temperature of the front-surface-side roller 81 is shown as "pre-heating front". The temperature of the back-surface-side roller 82 is shown as "pre-heating back". In an example of the operation of the image formation apparatus 1 shown in FIG. 11, also, the paper pre-heating control and the warm-up control for the fixer 60 are executed in parallel. In the following description, steps that are the same as the steps shown in FIG. 9 will be omitted, and different steps will be mainly described.

In the paper pre-heating control, in step S120 shown in FIG. 9, the controller 101 controls the paper conveyor 50 so that the paper conveyance speed is at the predetermined speed WVph. Meanwhile, in step S320 shown in FIG. 11, the controller 101 controls the paper conveyor 50 so that the paper conveyance speed is at the predetermined speed WVph and that the paper is conveyed in the reciprocating manner (repeatedly conveyed) at a predetermined reciprocation cycle LR.

In step S140 shown in FIG. 9, the controller 101 determines whether or not the fixer-inlet paper temperature is equal to or higher than the predetermined temperature WTpa2. Meanwhile, in step S340 shown in FIG. 11, the controller 101 determines whether or not the temperature of the intermediate transfer belt 421 (transfer belt temperature shown in FIG. 11) is equal to or higher than a predetermined temperature WTb.

Next, in the warm-up control for the fixer 60 in step S370 shown in FIG. 11, the controller 101 controls the fixer 60 so as to convey (fix-press) the paper while heating and pressurizing the paper with the fixing nip NP.

In step S200 shown in FIG. 9, the controller 101 performs control so that the drive speeds of the upper pressure roller 63 and the lower pressure roller 64 are at the predetermined speed WVf. Meanwhile, in step S380 shown in FIG. 11, control is performed so that the drive speeds of the upper pressure roller 63 and the lower pressure roller 64 are at the predetermined speed WVf, and that the upper pressure roller 63 and the lower pressure roller 64 are driven in a reciprocating manner at the predetermined reciprocation cycle LR. In a case where it is determined in step S340 of the paper pre-heating control that the temperature of the intermediate transfer belt 421 (the transfer belt temperature shown in FIG. 11) is equal to or higher than the predetermined temperature WTb (the paper pre-heating control is ended), the controller 101 performs control so as to switch from the drive in the reciprocating manner as described above to normal drive (drive in a conveyance direction), and so as to release the fixing.

Second Modification

Next, the image formation apparatus 1 according to a second modification will be described.

In the first modification, the paper repeatedly conveyed at the time of paper pre-heating is continuous paper. However, in the second modification, the paper is not limited thereto and is cut paper. In a case where the cut paper is conveyed, the paper conveyor 50 may also function as, for example, a circulatory conveyance path of the image formation apparatus 1. The circulatory conveyance path is capable of forming images on both surfaces of the paper while circulating and conveying the paper. The circulatory conveyance path circulates and conveys the paper by returning the paper, which is conveyed from the paper pre-heater 80 to a downstream side of the fixer 60, to an upstream side of the paper pre-heater 80. The intermediate transfer unit 42 and the conveyance rollers 53*a* are disposed between the downstream side of the paper feeder 51 and an upstream side of the paper ejector 52.

The paper conveyor 50 repeatedly conveys a predetermined number of sheets of the paper, which is the cut paper, at the time of the paper pre-heating. Thus, the intermediate transfer unit 42 and the conveyance rollers 53*a* are warmed by the paper. As a result, after transition from the paper pre-heating to the image formation, the paper is conveyed to the fixer 60 without the temperature of the paper falling at the intermediate transfer unit 42 or the conveyance rollers 53*a*. Therefore, it is possible to reduce occurrence of fixing under offset.

Third Modification

Figure 12:
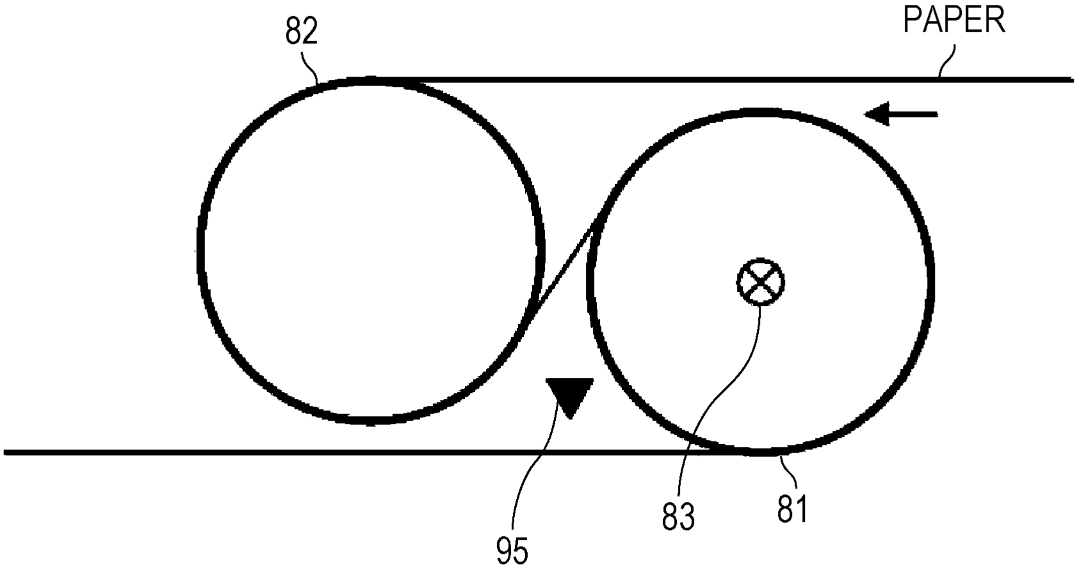
FIG. 12 is an enlarged view showing an example of a configuration of the paper pre-heater according to a third modification.

Next, the paper pre-heater 80 according to a third modification will be described with reference to FIG. 12. FIG. 12 is an enlarged view showing an example of a configuration of the paper pre-heater 80 according to the third modification.

In the above embodiment, as shown in FIG. 4, the front-surface-side roller 81 incorporates the front-surface-side heating source 83. The back-surface-side roller 82 incorporates the back-surface-side heating source 84. Because the diameter of the front-surface-side roller 81 is larger than the diameter of the back-surface-side roller 82, the circumferential length L1 in which the front-surface-side roller 81 and the front surface of the paper come into contact with each other is equal to or greater than the circumferential length L2 in which the back-surface-side roller 82 and the back surface of the paper come into contact with each other (L1≥L2).

Meanwhile, in the third modification, as shown in FIG. 12, the front-surface-side roller 81 incorporates the front-surface-side heating source 83, but the back-surface-side roller 82 does not incorporate the back-surface-side heating source 84. In addition, the diameter of the front-surface-side roller 81 is the same as the diameter of the back-surface-side roller 82. Thus, the circumferential length L1 is the same as the circumferential length L2 (L1=L2).

In the image formation apparatus 1 according to the third modification, only the front-surface side of the paper is heated, by which the temperature inside the paper does not rise excessively, and it is possible to reduce occurrence of fixing under offset while reducing a chance of toner blister or paper blister.

Fourth Modification

Figure 13:
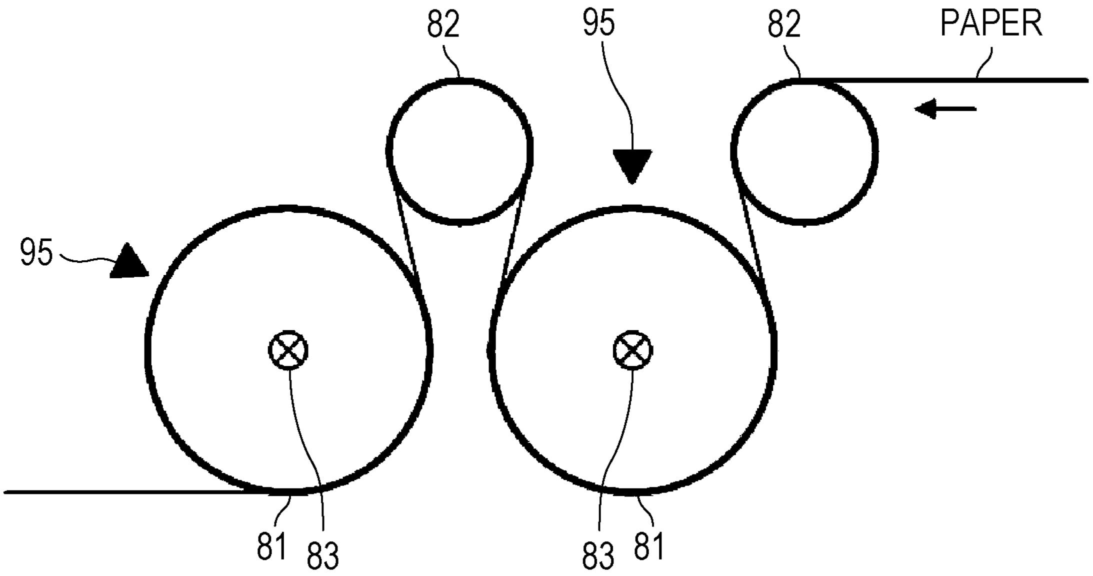
FIG. 13 is an enlarged view showing an example of a configuration of the paper pre-heater according to a fourth modification.

Next, the paper pre-heater 80 according to a fourth modification will be described with reference to FIG. 13. FIG. 13 is an enlarged view showing an example of a configuration of the paper pre-heater 80 according to the fourth modification.

In the third modification, as shown in FIG. 12, one front-surface-side roller 81 heats the front-surface side of the paper.

Meanwhile, in the fourth modification, as shown in FIG. 13, a plurality of front-surface-side rollers 81 heats the front-surface side of the paper. Each of the plurality of front-surface-side rollers 81 incorporates the front-surface-side heating source 83. The plurality of front-surface-side rollers 81 can efficiently heat the front-surface side of the paper.

Fifth Modification

Figure 14:
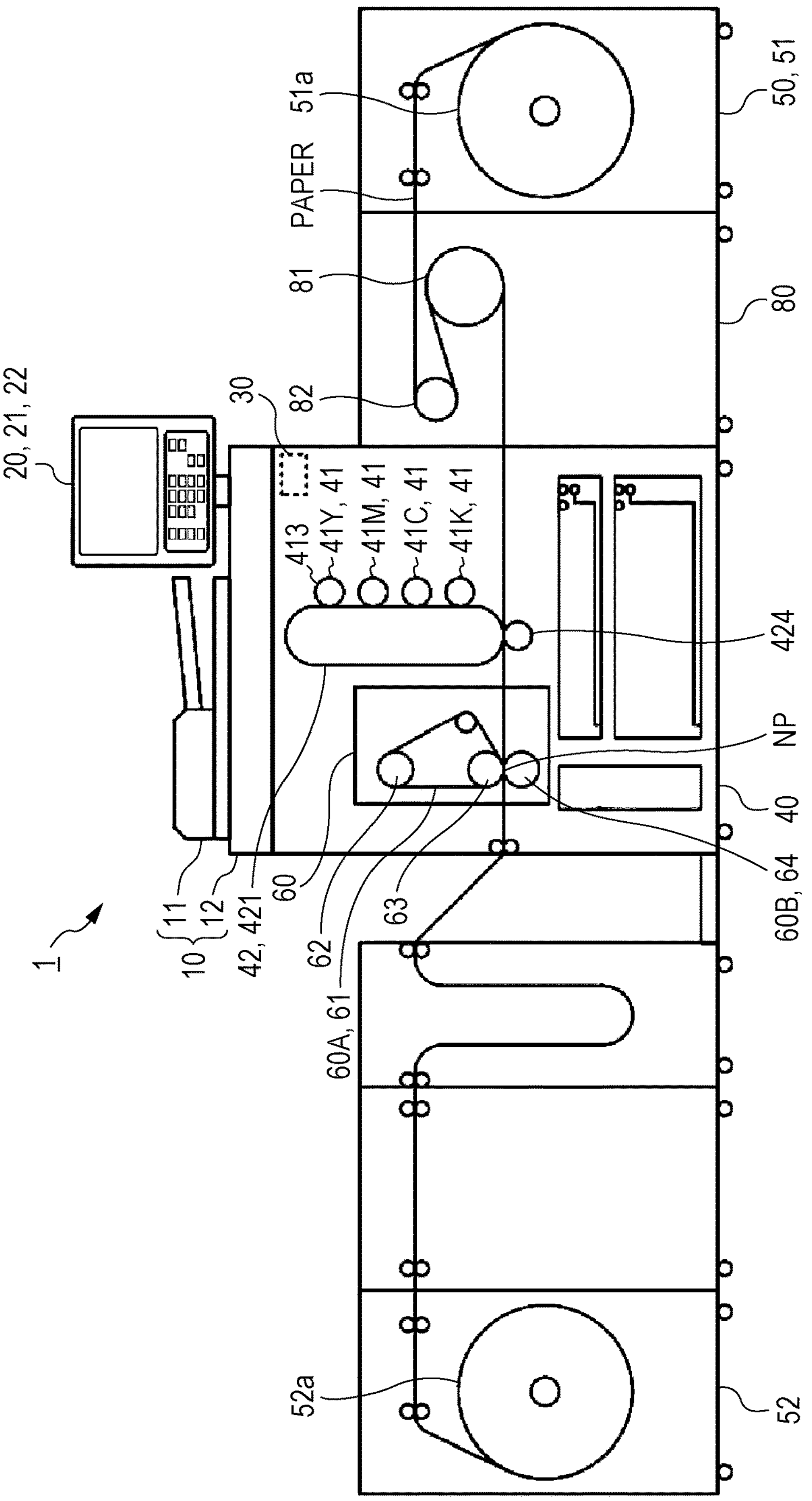
FIG. 14 is a diagram schematically showing an overall configuration of the image formation apparatus according to a fifth modification.

Next, the image formation apparatus 1 according to a fifth modification will be described with reference to FIG. 14. FIG. 14 is a diagram schematically showing the image formation apparatus 1 according to the fifth modification.

In the above embodiment, the paper conveyor 50 includes a plurality of conveyance rollers 53*a* disposed between the paper pre-heater 80 and the intermediate transfer unit 42 so as to come into contact with the paper.

Meanwhile, in the fifth modification, the paper conveyor 50 is not disposed between the paper pre-heater 80 and the intermediate transfer unit 42. Specifically, while the conveyance rollers 53*a* to be in contact with the paper are disposed between the paper pre-heater 80 and the intermediate transfer unit 42 in the embodiment shown in FIG. 1, no conveyance rollers are disposed between the paper pre-heater 80 and the intermediate transfer unit 42 in the fifth modification shown in FIG. 14. Thus, it is possible to reduce a decrease in temperature of the paper heated by the paper pre-heater 80 and conveyed from the paper pre-heater 80 to the intermediate transfer unit 42.

In the above embodiment and the modifications, aspects in which the paper pre-heater 80 is brought into contact with the paper has been described. However, the present invention is not limited thereto, and the paper pre-heater 80 may heat the paper without being brought into contact with the paper. In this case, for example, an infrared heater or the like is used as the paper pre-heater 80.

The present invention is suitably used for an image formation apparatus that is required to reduce occurrence of image formation failure.

Although embodiments of the present invention have been described and illustrated in detail, the disclosed embodiments are made for purposes of illustration and example only and not limitation. The scope of the present invention should be interpreted by terms of the appended claims. That is, the present invention can be implemented in various forms without departing from the gist or main features thereof.

What is claimed is:

1. An image formation apparatus comprising:
- a transferrer that forms a toner image on an image formation surface of paper;
- a fixer that fixes the toner image on the paper;
- a paper conveyor that conveys the paper between an upstream side of the transferrer and a downstream side of the fixer in a paper conveyance direction;
- a paper pre-heater that heats, on the upstream side of the transferrer in the paper conveyance direction, the image formation surface of the paper;
- a temperature sensor configured to detect a fixing temperature of the fixer; and
- a controller configured to:
  - turns on the paper pre-heater when the fixing temperature of the fixer detected by the temperature sensor is equal to or lower than a first predetermined temperature; and
  - turns off the paper pre-heater when a paper temperature of the image formation surface of the paper at an inlet of the fixer is equal to or higher than a second predetermined temperature.

2. The image formation apparatus according to claim 1, wherein the paper pre-heater comes into contact with the image formation surface of the paper to heat the image formation surface of the paper.

3. The image formation apparatus according to claim 1, wherein the paper pre-heater heats the image formation surface of the paper at time of warm-up of the fixer.

4. The image formation apparatus according to claim 1, wherein the paper pre-heater includes
- a front-surface-side roller that is disposed so as to come into contact with the image formation surface of the paper and heats a front surface of the paper, and
- a back-surface-side roller that is disposed at a position not facing the front-surface-side roller in the paper conveyance direction so as to come into contact with a back surface of the paper, and heats a back surface of the paper.

5. The image formation apparatus according to claim 4, wherein a heat amount of the front-surface-side roller is equal to or larger than a heat amount of the back-surface-side roller.

6. The image formation apparatus according to claim 4, wherein the front-surface-side roller includes a heating source that heats a front surface of the paper.

7. The image formation apparatus according to claim 6, wherein the back-surface-side roller includes a heating source that heats a back surface of the paper.

8. The image formation apparatus according to claim 7, wherein temperature of the front-surface-side roller is equal to or higher than temperature of the back-surface-side roller.

9. The image formation apparatus according to claim 4, wherein, in the paper conveyance direction, a length in which the front-surface-side roller and the front surface of the paper come into contact with each other is equal to or more than a length in which the back-surface-side roller and the back surface of the paper come into contact with each other.

10. The image formation apparatus according to claim 4, wherein, in the paper conveyance direction, a length in which the front-surface-side roller and the front surface of the paper come into contact with each other is longer than a length in which the back-surface-side roller and the back surface of the paper come into contact with each other.

11. The image formation apparatus according to claim 1, wherein no paper conveyor is disposed between the paper pre-heater and the transferrer in the paper conveyance direction.

12. An image formation apparatus comprising:
- a transferrer that forms a toner image on an image formation surface of paper;
- a fixer that fixes the toner image on the paper;
- a paper conveyor that conveys the paper between an upstream side of the transferrer and a downstream side of the fixer in a paper conveyance direction; and
- a paper pre-heater that heats, on the upstream side of the transferrer in the paper conveyance direction, the image formation surface of the paper,
- wherein the paper pre-heater heats the image formation surface of the paper at time of warm-up of the fixer, and
- at the time of the warm-up, the paper conveyor conveys the paper at a conveyance speed lower than a conveyance speed at a time of image formation in which the toner image is formed on the image formation surface of the paper.

13. The image formation apparatus according to claim 12, wherein the paper is cut paper, and the paper conveyor repeatedly conveys a predetermined number of sheets of the paper.

14. An image formation apparatus comprising:

a transferrer that forms a toner image on an image formation surface of paper;

a fixer that fixes the toner image on the paper;

a paper conveyor that conveys the paper between an upstream side of the transferrer and a downstream side of the fixer in a paper conveyance direction; and a paper pre-heater that heats, on the upstream side of the transferrer in the paper conveyance direction, the image formation surface of the paper, wherein the paper pre-heater heats the image formation surface of the paper at time of warm-up of the fixer, the paper conveyor repeatedly conveys the paper at the time of the warm-up, and the paper pre-heater heats the image formation surface of the repeatedly conveyed paper.

15. The image formation apparatus according to claim 14, wherein the fixer heats the image formation surface of the repeatedly conveyed paper.

16. The image formation apparatus according to claim 14, wherein the paper is continuous paper, and the paper conveyor conveys, for a predetermined distance or longer, the paper in the paper conveyance direction and in a direction opposite to the paper conveyance direction in a reciprocating manner.

* * * * *